INVENTORS
HAROLD D. BARKER
THOMAS S. STAFFORD
BY D. Kendall Cooper
ATTORNEY

Jan. 11, 1966 H. D. BARKER ETAL 3,229,259

MULTIPLE RATE DATA SYSTEM

Filed Feb. 1, 1962 5 Sheets-Sheet 2

Jan. 11, 1966 H. D. BARKER ETAL 3,229,259

MULTIPLE RATE DATA SYSTEM

Filed Feb. 1, 1962 5 Sheets-Sheet 3

MULTIPLE RATE DATA SYSTEM

Filed Feb. 1, 1962 5 Sheets-Sheet 5

United States Patent Office 3,229,259
Patented Jan. 11, 1966

3,229,259
MULTIPLE RATE DATA SYSTEM

Harold D. Barker and Thomas S. Stafford, Poughkeepsie, N.Y., assignors to International Business Machines Corporation, New York, N.Y., a corporation of New York Filed Feb. 1, 1962, Ser. No. 170,401
11 Claims. (Cl. 340—172.5)

This invention relates to data systems, and more particularly to a system for handling data that is presented over a number of lines at a plurality of different rates.

Each portion of a data processing or communication system normally performs its functions at a particular operating rate that is preestablished. It has become increasingly important, however, to provide systems with greater data rate flexibility, since some data processing situations require the utilization of equipments that are based on varied rates of transmission or operation.

In the prior art, situations of this kind have been solved in a number of ways, none of which has been entirely satisfactory. In one typical system where data is presented from a number of source equipments that operate at different rates, the processor has first handled the entire service requirements of a first group of equipments operating at a particular rate, and has then proceeded to other equipment groups that operate at different rates. Each source equipment is required to wait until the system has adjusted itself to handle the associated rate for an entire group of equipments. As a consequence, little flexibility has been achieved, and obvious limitations exist with respect to data transfer operations generally, including delays encountered in handling service requests.

An object of the present invention, therefore, is to provide a system for handling data that a presented at a plurality of transmission rates.

Another object of the invention is to provide a system for handling data that is supplied at different rates and in intermixed fashion from a number of sources with complete an automatic accommodation of each rate.

Another object of the invention is to provide a system for handling data supplied at any cne of a number of transmission rates where the several rates are functionally related.

In accordance with these and other objects of the invention, a system has been provided in which a number of data lines are scanned in sequence for detection of information, and in which a proper rate of operation is established for each line as encountered.

The foregoing and other objects, features and advantages of the invention will be apparent from the following more particular description of the preferred embodiment of the invention as illustrated in the accompanying drawings.

*General description*

Figure 1:
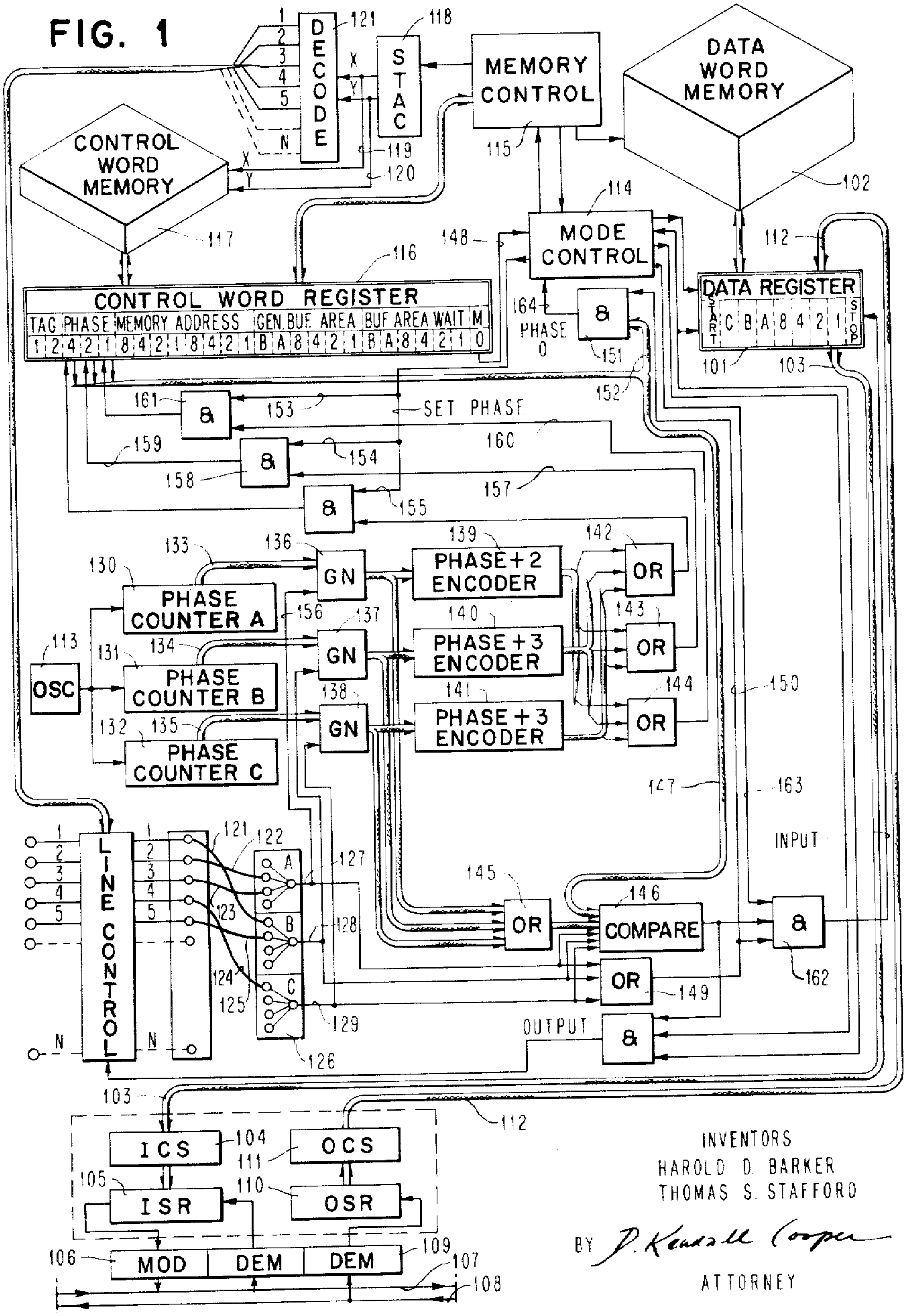
FIGURE 1 is a system diagram of a preferred embodiment of the invention.

The system of FIGURE 1 represents an interchange which forwards input messages of inquiry from a group of terminal sets (not shown to a central computer (not shown) and receives output messages that are sent in reply to the terminal sets by the computer.

Input messages are received from each terminal set over an associated low speed line 1–N. The messages are composed of related characters of information that are based on well known bit configurations such as: Start-Check (C)–B–A–8–4–2–1–Stop; or Start–1–2–3–4–5–Stop. Each line 1–N provides a succession of bits in one of the formats indicated which are shifted into a data register 101 to form the proper characters. Related bits and characters from each line are stored temporarily in a data word memory 102 until a complete message or message segment is assembled.

Completed input messages or message segments are transferred serial by character from the data word memory 102 through the data register 101 over bus 103 to an input character storage (ICS) register 104, and from there to an input shift register (ISR) 105 for serial by bit transfer to a modulator (MOD) 106, and transmission over line 107 to a central computer, not shown.

Output messages are received serial by bit over line 108, detected by a demodulator (DEM) 109, shifted into an output shift register (OSR) 110, and transferred to an output character storage (OCS) register 111. Each output character is subsequently transferred over bus 112, and through the data register 101, to the data word memory 102. When a complete output message or message segment has been received, it is then transferred from memory 102, with individual bits being forwarded to the proper terminal set on successive line scans.

Figure 2:
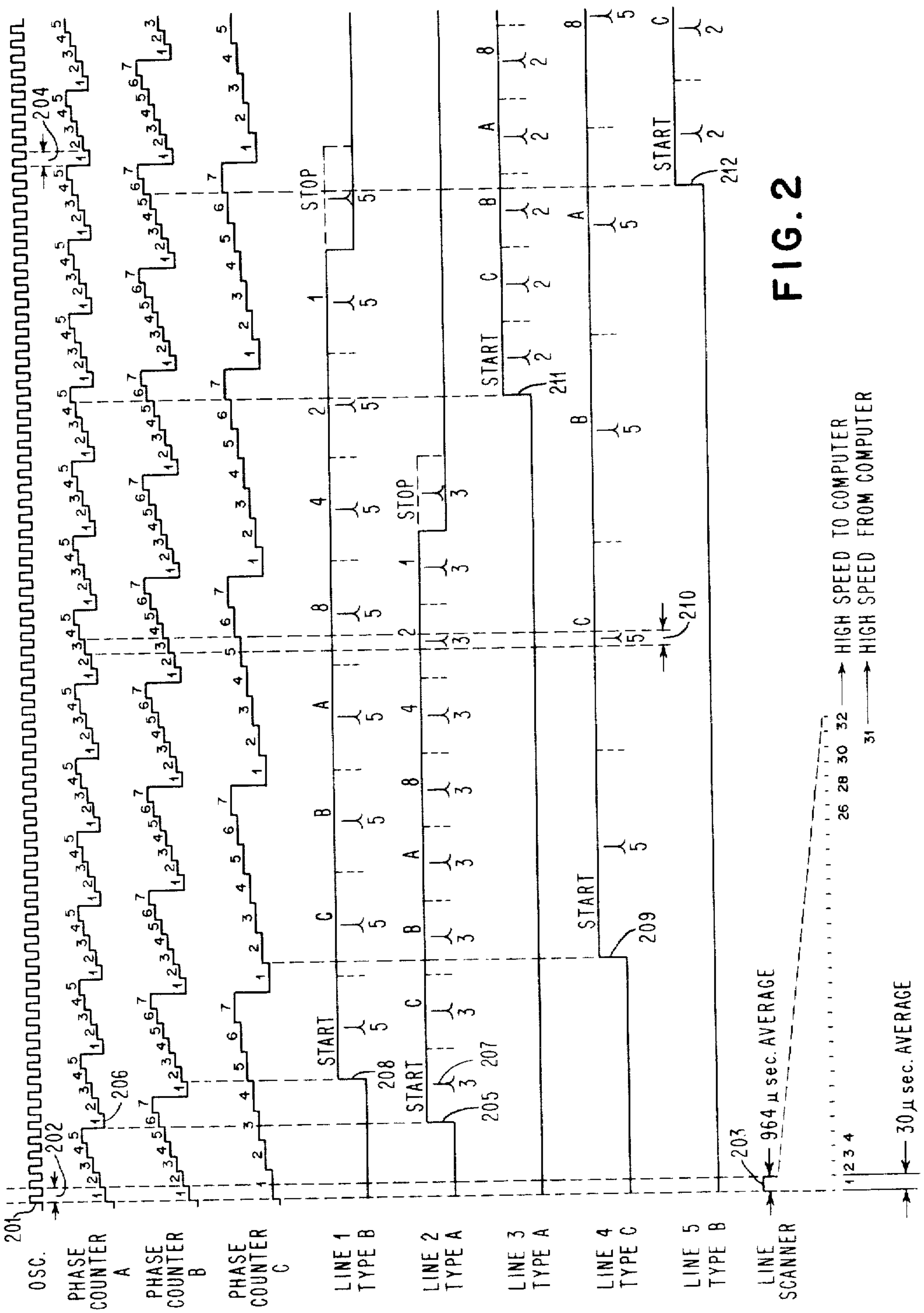
FIGURE 2 represents timing and signal relationships in the system of FIGURE 1.

Each line 1–N is sampled only once during a particular scan interval, but in the preferred embodiment, successive line scans occur at a much higher rate than the transmission rate of any data line 1–N. Typical line scan, data, and timing relationships are shown in FIGURE 2. A basic cyclic rate, as represented by the waveform 201 in FIGURE 2, is established by a master oscillator, such as oscillator 113, FIGURE 1. Each basic cycle includes a square wave alternation that occurs in an interval of 964 $\mu$s. such as 202, FIGURE 2. A line scan interval, as indicated at waveform 203, FIGURE 2 (which is shown with an expanded time base) is assumed to correspond, on the average, to a basic cycle of oscillator 113, interval 202. While they are not shown, it will be understood that line scans like scan 203 initiated at the start of an oscillator cycle occur in each successive basic cycle. The scan 203 interval is actually composed of a number of stepping intervals 1–30 which correspond to the lines 1–N of FIGURE 1. Any desired number of lines within a reasonable range could be provided for during this interval, rather than the 30 that are indicated in FIGURE 2, by increasing or decreasing the number of stepping intervals accordingly.

In addition to the stepping intervals 1–30, each line scan period also includes a step 31 which is used for gating an output character from the output character storage register 111 to the data memory 102, and a step 32 which is used for gating an input character from data word memory 102 to the input character storage register 104.

It is assumed for purposes of explaining the invention that several types of terminal sets operating at a number of different transmission rates are connected to the input lines 1–N. The invention provides a high degree of flexibility in the system since it permits a complete and random intermixing of terminal types on the lines 1–N. That is each line 1–N can have a terminal set of any one of the types and bit rates in use, and the interchange will automatically handle the service requirements of each line when it is encountered in any scanning sequence with appropriate consideration being given to the transmission rate of the line involved.

In a typical situation, the following operating and transmission rates are encountered:

| | Frequency | Duration of Basic Cycle or Bit Interval |
|---|---|---|
| Oscillator 113 | 1,041.7 cycles/second | 964 microseconds. |
| Type A line | 207.4 bits/second | 4.9 milliseconds. |
| Type B line | 148.4 bits/second | 6.7 milliseconds. |
| Type C line | 74.2 bits/second | 13.5 milliseconds. |
| High Speed lines 107 and 108. | 2,000 bits/second | .5 millisecond. |

The frequencies noted above have been chosen as exemplary, and it will be apparent that numerous other relationships can be established. The low speed line bit intervals, for design simplification, have been selected so that they have the following proportional relationships:

$$A:B:C=5:7:14$$

The oscillator 113 frequency and its cyclic interval are established so that the 5:7:14 relationships indicate the number of scan intervals (one scan interval includes 32 stepping intervals) which occur during the various types of bit intervals. Thus, five (5) scan intervals occur during each Type A bit interval, seven (7) scan intervals occur during each Type B bit interval; and fourteen (14) scan intervals occur during each Type C bit interval. All line scans may be effective for sampling the Types A and B, but as will be shown shortly, only alternate scans, or seven (7) of a group of fourteen line scans are effective for sampling a Type C line.

The scanning, sampling and data transfer activities of the system of FIGURE 1 are under control of a mode control section 114 and a memory control section 115. The actions of both control sections 114 and 115 are governed primarily by the contents of a control word register 116.

Control words are transferred to register 116 from a control word memory 117. Each line 1–N has an associated control word that is located at a particular address in a control word memory 117. Since the lines are sampled in sequence, the respective control words are also preferably arranged in sequence in memory 117. Control word addresses are established by a storage terminal address counter (STAC) 118 at coordinate X–Y locations by signals on lines 119 and 120. When a particular control word is addressed, the corresponding line of one of the N terminal sets is also addressed by deriving a line number from the X–Y addresses in decode block 121. Therefore, as each line is sampled during a scan interval, its corresponding control word will be in register 116.

Each control word has a configuration like that shown in FIGURE 1, and the control word bits are used to establish functions as indicated below:

Tag—2 bits: Parity checking and end of message (EOM) indications.
Phase—3 bits: Indicates sampling time for line involved.
Memory address—8 bits: Defines data character location in memory 102.
General buffer area—6 bits: Defines message block (plurality of character) in memory 102.
Buffer area waiting—6 bits: Indicates location of output message in memory 102 to be forwarded to terminal.
Mode (M)—1 bit: Binary 1 indicates that output message to terminal is in progress; binary 0 indicates that input message from terminal is in progress.

The data word memory 102 is preferably divided into blocks of characters for handling messages or message characters.

A suggested memory 102 configuration is as follows:
Total capacity, 4000 characters; number of message blocks (general buffer areas) 40 blocks of 100 characters each.

Memory 102 block configuration for complete message:
Terminal address, 1 character; body of message, 98 characters; end of message, 1 character.
Memory 102 block configuration for message segment (incomplete message):
Terminal address, 1 character; body of message, 98 characters; end of message incomplete, 1 character.

When any line indicates that service is required, a general buffer area (GBA) is assigned to that line for accumulating data bits from that line and the general buffer area address is stored in the control word for that line. Each character is assembled in a particular character location within the assigned block of characters as defined by a memory address (MA) in the associated control word. As each character is completed, the next sequential character address is set into the control word. If a complete message is assembled, the GBA (block) address is reset to zero, in preparation for another message. If an incomplete message has been assembled (message is longer than block capacity of 98 data characters) another block is assigned to the line involved for accumulating a succeeding message portion.

The present invention will be explained by considering only the data transmission activities on lines 1, 2, 3, 4, and 5. These lines are arbitrarily assumed to be types B, A, A, C, B, respectively.

In FIGURE 1, the lines 1–5 are connected by jumpers 121–125 to an appropriate line type section A, B or C of a plugboard 126. Each section A, B and C of plugboard 126 serves to OR together all lines of its associated type and provide outputs on lines 127 (Type A), 128 (Type B) or 129 (Type C) when any connected line is active, that is, has a data signal present.

Typical signal conditions that might exist on the lines 1–5 are shown in FIGURE 2. It is assumed in FIGURE 2 that all characters have 1 data bits (up levels) in all significant positions, but various combinations of 1 data bits and 0 data bits (down levels) are possible, depending on the character configuration. Also it is assumed that start bits are 1, and stop bits are 0. The arrival of signals among the various lines is completely asynchronous, but the present invention enables each line to be serviced regardless of the time of arrival of its signals with respect to any other line and with proper account being given to the the data rate involved. In the present invention, all lines are handled in a completely flexible, efficient and accurate manner. Respectively associated with each line type (A, B or C), are line phase counters 130 (A), 131 (B) and 132 (C). Each counter 130, 131 or 132 is stepped once during each basic cyclic interval of oscillator 113.

The counters 130, 131 and 132 supply digital output combinations on buses 133, 134 and 135 to gating networks (GN) 136, 137 and 138. Each gating network is also under control of an associated Type A, B or C input data line from the A, B and C sections of plugboard 126.

The respective outputs of gating networks 136, 137 and 138 are applied to realted encoders 139, 140 and 141 and or blocks 142, 143 and 144. The outputs are also directed in common to an OR block 145 and from there to a compare circuit 146. Compare circuit 146 receives other inputs over bus 147 from the 4–2–1 phase positions of control word register 116.

The significance of the circuit arrangements just mentioned will be evident by an inspection of FIGURE 2 and a discussion of the typical sequence of operations. All phase counters are stepped simultaneously by oscillator 113 pulses, but it can be observed in FIGURE 2 that each counter counts to a different count level. Counter A counts from 1 to 5 in a repetitious sequence; counter B counts from 1 to 7, counter C actually counts from 1–14, but since only alternate count outputs are used for control purposes, the net effect is that the counter C effective outputs are equivalent to a 1 to 7 sequence that covers an interval which is twice as long as that required for counter B to count from 1 to 7. The respective counter outputs although digital in nature, are represented as step functions in FIGURE 2 for greater clarification of their relationship.

Figure 3:
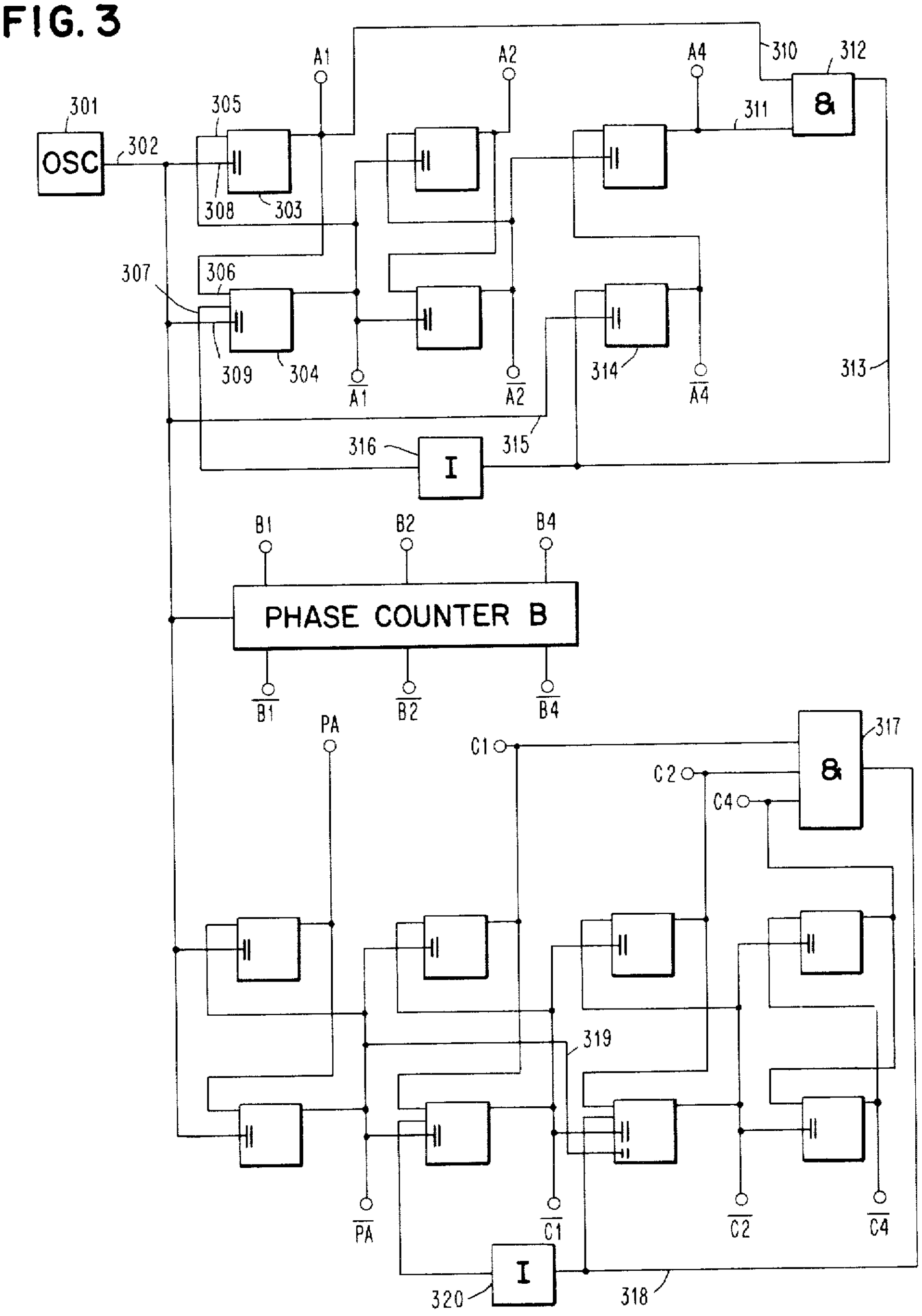
FIGURE 3 illustrates counter means that are useful in the system of FIGURE 1.

The phase counters are shown in detail in FIGURE 3. An oscillator 301, which corresponds to oscillator 113 in FIGURE 1, steps all counters in parallel by pulses supplied on line 302. Each counter has a number of bistable flip-flop units comprised of an upper and lower block that are connected in a conventional feedback arrangement, such as blocks 303 and 304 for position A1 of counter A. The various blocks have one or more gating inputs such as inputs 305, 306 and 307 for counter A, position A1. A.C. shifts are applied to each blocks at inputs such as 308 and 309 for position A1, to effect changes in state when the flip-flop is properly conditioned.

The various counter positions and stepping actions are as follows:

COUNTER A

| | Position | | |
|---|---|---|---|
| | A1 | A2 | A4 |
| Reset | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 1 | 1 | 0 | 0 |

COUNTER B

| | Position | | |
|---|---|---|---|
| | B1 | B2 | B4 |
| Reset | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 1 | 1 | 0 | 0 |

COUNTER C

| | Position | | | | Effective Count |
|---|---|---|---|---|---|
| | Phase Active (PA) | C1 | C2 | C4 | |
| Reset | 0 | 0 | 0 | 0 | |
| Reset Phase Active | 1 | 0 | 0 | 0 | |
| 1 | 0 | 1 | 0 | 0 | |
| 2 | 1 | 1 | 0 | 0 | 1 PA |
| 3 | 0 | 0 | 1 | 0 | |
| 4 | 1 | 0 | 1 | 0 | 2 PA |
| 5 | 0 | 1 | 1 | 0 | |
| 6 | 1 | 1 | 1 | 0 | 3 PA |
| 7 | 0 | 0 | 0 | 1 | |
| 8 | 1 | 0 | 0 | 1 | 4 PA |
| 9 | 0 | 1 | 0 | 1 | |
| 10 | 1 | 1 | 0 | 1 | 5 PA |
| 11 | 0 | 0 | 1 | 1 | |
| 12 | 1 | 0 | 1 | 1 | 6 PA |
| 13 | 0 | 1 | 1 | 1 | |
| 14 | 1 | 1 | 1 | 1 | 7 PA |
| 1 | 0 | 1 | 0 | 0 | |
| 2 | 1 | 1 | 0 | 0 | 1 PA |

When counter A reaches a count of 5, the A1 and A4 outputs are recognized on lines 310 and 311 by AND (&) gate 312. The resulting gate 312 output on line 313 conditions A4 for resetting by conditioning lower block 314 for response to the next A.-C. shift on line 315. The gate 312 output is reversed by inverter 316 to decondition gate 307 of flip-flop A1. A1 therefore does not respond to the A.-C. shift and remains in its 1 state. The sequence is then repeated.

Counter B has a configuration similar to counter A but counts to 7, is then set back to 1, and repeates.

Counter C counts in a conventional binary fashion, but the first position is designated phase active rather than C1, and the other positions are designated C1, C2 and C4, rather than C2, C4, C8, as is done conventionally. The output of the phase active poistion is used to gate outputs from counter C in an alternate manner, so that in effect, 7 effective count conditions are supplied, rather than 14. The only time that counter C is effective is when the phase active flip-flop is in the 1 state.

Counter C is returned to the 1 state by applying C1, C2 and C4 outputs to gate 317. Gate 317 output on line 318 conditions the lower block of C2 for turning C2 off when an A.-C. shift arrives on line 319 as a result of the phase active position turning off. C2 turning off turns off C4 conventionally. An inverter 320 output deconditions the lower block of C1 so that it will not respond to the A.-C. shift when phase active turns off. Therefore, C1 remains in a 1 state, and the count sequence is repeated.

All counters reach a 1 state simultaneously at periodic intervals as during intervals 202 and 204, FIGURE 2.

It is apparent that the various bit interval types are readily divisible into increments which can be directly translated into a particular count level of the associated phase counter.

Each Type A bit is divisible into 5 increments. Any increment may be designated 1, 2, 3, 4, or 5 depending on the time of appearance of the Type A bit with respect to the count level of the Type A counter. The Type B bit is divisible into 7 increments, and any increment can be designated 1, 2, 3, 4, 5, 6 or 7 depending on the bit time occurrence with respect to the count level of the Type B counter. The same applies to the Type C bit which is divisible into 7 increments that are twice as long as the 7 increments of the Type B bit.

Because of line distortion, each bit interval may not exactly correspond to the theoretical bit length previously set forth for Types A, B and C. For this reason, it is desirable to sample each bit near its center rather than at its beginning.

The sample time for all bits in any character is established by determining the count level that exists when the start bit of that character rises, and adding a numerical factor to the count which will insure a desired center sampling.

This action is performed by the encoders 139, 140 and 141. The factors added to the actual phase counts for each line type are as follows:

| | Count | Factor |
|---|---|---|
| Type A | 5 | +2 |
| Type B | 7 | +3 |
| Type C | 7 | +3 |

The actual count plus the related factor is entered in the phase positions of the control word associated with a particular line when a start bit occurs on that line.

*Operation*

Storage terminal address counter (STAC) 118 is driven by memory control 115 at the line sampling rate. Referring to FIGURE 2, during the first scan interval, corresponding to the 964 microsecond cycle of oscillator 113, each terminal line 1–N (thirty lines in the embodiment shown) is interrogated once. The step interval for each line is thirty microseconds as shown in the expanded time base diagram 203 labelled "line scanner." Thus, each of the N lines is sequentially interrogated by the outputs of decode 121, which is driven by STAC, providing energization of the lines labelled 1 through N for a period of thirty microseconds each. Further, at the end of each scan interval two step positions 31 and 32, are provided for transfer of information from and to the computer respectively.

STAC addresses the control word memory 117 via X and Y address lines 119, 120 and a control word assigned to line 1 is read from memory 115 into control register 116. The contents of the memory address in data word memory 102 specified by this control word are placed in data register 101. Since no prior bits have been received, the contents are all zeros. At the same time output 1 of decode 121 is energized in response to an input from the STAC to select line 1 via line control for a period of 30 microseconds step interval. After 30 microseconds, STAC is stepped one position, the control word assigned to line 2 is placed in control register 116, the contents of the memory address specified by control word 2 are placed in data register 101, and output 2 of decode 121 is energized in response to the STAC to thereby select line 2 for a 30 microsecond step interval. Stepping continues in this manner until all lines have been interrogated during this first scan interval. At the end of the 964 microsecond scan interval, scanning of the lines begins again. Since no start signal appears on ay of the lines 1–N during the first five scan intervals, no further operations occur, and no data is transferred to the data register.

During the sixth scan interval the following sequence of operations occurs. First the STAC addresses control word memory 117, reads control word 1 into control word register 116, places the contents of the memory address specified by this control word into data register 101 (still all zeros) and the output 1 of decode 121 selects line 1. A start bit is not present at this time on line 1 so no further operations occur with respect to line 1. Next, the STAC is stepped, selects control word 2, places control word 2 into the control word register, places the contents of the memory adress specified by control word 2 into the data register 101, and the output 2 of decode 121 is energized selecting line 2 for a 30 microsecond stepping interval. Since a start signal is present on line 2 at this time (shown at 205 in FIGURE 2) the start signal is interrogated during the 30 microsecond interval and applied via jumper wire 122 to line 127.

The control word for line 2 is in register 116 and establishes input mode by line 148 to mode control 114. The phase count is 0–0–0 in register 116. The rise of the line 2 start bit at waveform 205 occurs when phase counter A is at a count of 1. The start signal is applied via line 127 simultaneously to gating network 136 and to OR block 149. OR block 149 output on line 150 is applied to an AND (&) gate 151. Gate 151 has other inputs on bus 152 which are up only when the phase count is 0–0–0, as at present.

An output from gate 151 on line 164 under these conditions, informs mode control 114 that a new character is starting for the line whose control word is in register 116. The start of any new character can be indicated by setting a trigger in mode control 114, for example, or by other well known techniques. Mode control 114 provides a gating signal on lines 153, 154 and 155 which permits the setting of a phase count in register 116 that will be used in sampling the bits of the character on line 2.

Figure 4:
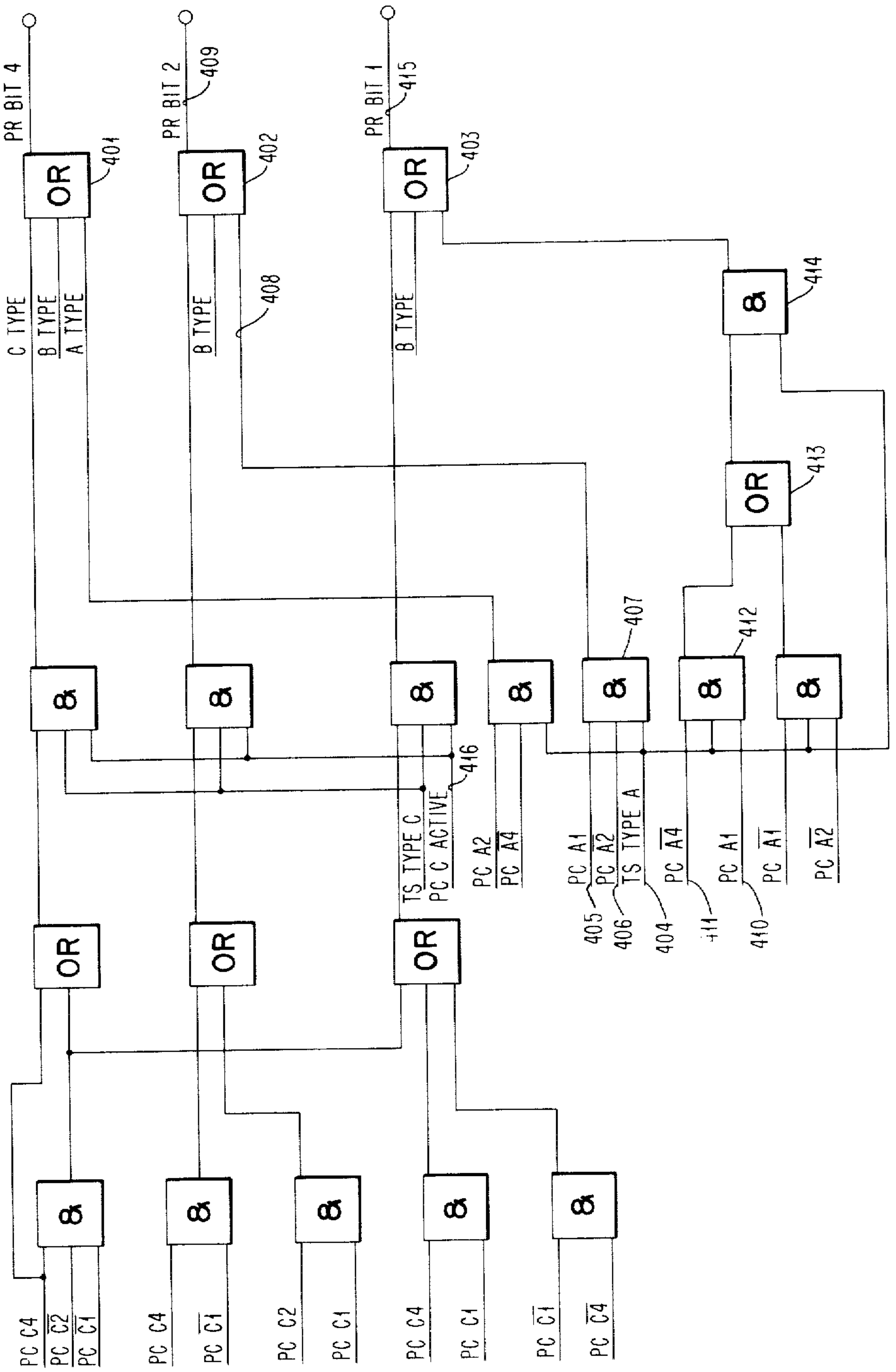
FIGURE 4 is an encoding circuit.

The action for establishing the phase count at this time can be better understood by reference to FIGURE 4 which shows encoders 139(A) and 141(C) in detail. OR blocks 401, 402 and 403 in FIGURE 4 correspond respectively to OR blocks 142, 143 and 144, FIGURE 1. Encoder 140(B) is not shown in detail in FIGURE 4, but is similar to the encoder 141(C) with the exception that no gating line phase counter C active (PCC active) is needed for Type B encoding.

The start bit on line 2 rises at an A phase count of 1 at waveform 206. In FIGURE 4, the terminal set Type A (TS Type A) line 404 will be up as a result of an output from the A section of plugboard 126 on line 156. The status of counter A is $A1$–$\overline{A2}$–$\overline{A4}$ at this time. A1 and $\overline{A2}$ lines 405 and 406 to gate 407 are up, so gate 407 supplies an output on line 408 to OR block 402. OR block 402 supplies an output on line 409. OR block 402 corresponds to OR block 143, and line 409 corresponds to line 157, in FIGURE 1. Gate 158 supplies an output on line 159 to set phase position 2 in register 116.

Returning to FIGURE 4, A1 line 410 and $\overline{A4}$ line 411 to gate 412 are also up, so an output through OR block 413, and gate 414 passes to OR block 403. OR block 403 provides an output on line 415. OR block 403 corresponds to OR block 144 and line 415 corresponds to line 160, in FIGURE 1. Gate 161 in FIGURE 1 in turn provides an output to set phase position 1 in register 116. The phase count is therefore 0–1–1 in phase positions 4–2–1, or a count of 3.

The phase count of 1 that existed at the rise of the start bit on line 2 plus the factor 2(1+2), or 3, is entered in the line 2 control word in register 116.

Each bit in this character will be sampled at a phase count of 3, as indicated by the first sample spike 207, FIGURE 2. The sampling occurs when the current count of phase counter A equals the count just stored in the control word for line 2. For a Type A line, like line 2, sampling occurs on every fifth line scan interval. The determination that sample time has arrived for any active line is made in compare network 146, which is shown in greater detail in FIGURE 5.

Figure 5:
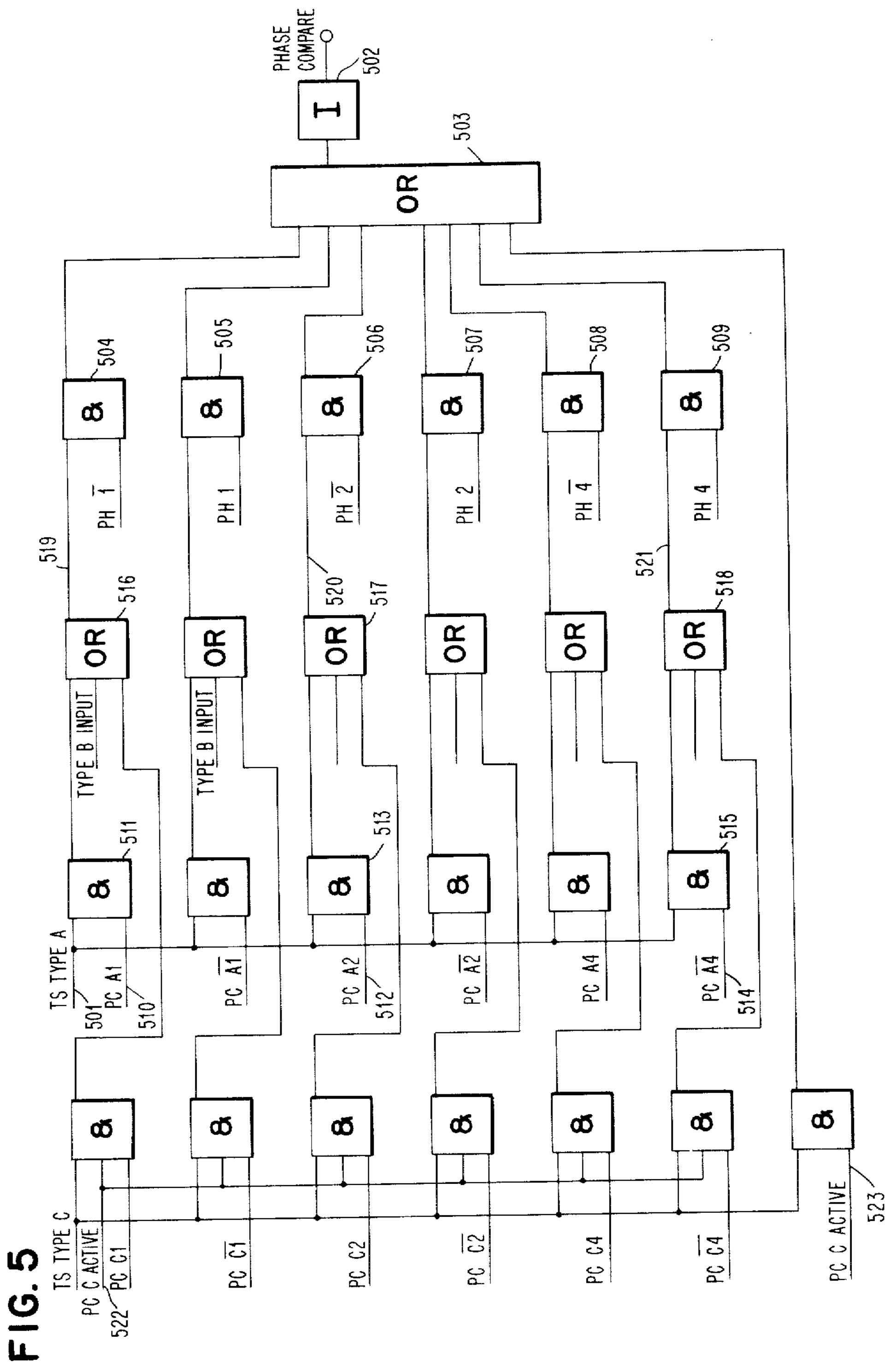
FIGURE 5 is a comparison circuit.

Since line 2 is being considered, with its phase count of 3, it is necessary to derive an output from the circuitry of FIGURE 5 when phase counter A is equal to 3, for sampling line 2. This is performed in the following manner. In FIGURE 5, whenever a Type A line, such as line 2 is being scanned, the gating line 501 is up. It is necessary to derive an up level from inverter 502 and this will exist only when the output from OR block 503 is down. In order for the output of OR block 503 to be down, all inputs to it from AND gates 504–509 must be down. A phase counter A count of 3 (A1–A2–$\overline{A4}$) activates line 510 to gate 511, line 512 to gate 513, and line 514 to gate 515. Gates 511, 513 and 515 supply outputs to OR blocks 516, 517 and 518 which are passed to gates 504, 506 and 509 on lines 519, 520 and 521, respectively.

Each gate 504–509 has one input from the phase register 116. It can be seen that if the phase count in register 116 is 3 (PH1–PH2–$\overline{PH4}$), none of the gates 504–509 will be activated, and a phase compare signal will exist from inverter 502. In FIGURE 1, the phase compare signal from compare circuit 146 conditions one input of an AND gate 162, which supplies an output to set a 1 bit in data register 101, when the other gate 162 inputs, input mode on line 163 and a 1 bit signal from OR block 149 are up. The data bits on line 2 for this character will be sampled each time the phase counter A and the phase count in register 116 equal 3. The sampling times for succeeding characters on line 2 may be different, and depend on the times of arrival of the character start bits.

The start bit for line 2 is sampled at a count of 3 of phase counter A corresponding to pulse 207 in FIGURE 2. Thus, it is not until the eighth scan interval that a start bit is transferred to data register 101 when the control word corresponding to line 2 is in control word register 116. At this time, the contents of the memory address specified by control word 2 are placed in data register 101 and the start bit is sampled into the left hand stage of the data register 101 via coincidence of the inputs of AND circuit 162. At the end of the stepping interval corresponding to line 2 the contents of the data register 101 are stored in the memory address in the data memory 102 specified by control word 2. Of course, it is necessary to shift the start bit one position to the left to make room for the first data bit on line 2 at the next sample time for line 2. This first data bit will be sampled during the scan interval 13 which again corresponds to count of 3 of phase counter A. Of course, during the step interval corresponding to line 2 the control word for line 2 is in control register 116, and the data portion at the memory address specified by that control word has been placed in data register 101. At this time the C bit is transferred to the left hand portion of the data register. Now the start bit is in the next to last position of data register and the C bit is in the last position. Thus, on successive line scans when coincidence of the phase counter position 3 occurs a bit is sampled and transferred into the data register. The register is then shifted one position to the left to make room for the next data bit and stored into the data word memory until that particular line is again interrogated during the next line scan interval.

It is assumed that line 1, which is a Type B line, is the next to supply a character in the sequence of FIGURE 2. The rise of the line 1 start bit is detected at waveform 208 at a B type phase count of 2. The phase count of 2 plus the factor 3(2+3), or 5, is entered in the control word associated with line 1 in a manner similar to that just described for line 2. Each data bit in the line 1 character will be sampled during any line scan when the current count of phase counter B is 5 and is therefore equal to the phase count of 5 that is stored in the control word for line 1, as determined by the compare network 146.

The next character start bit to arrive appears on line 4, a Type C line, as indicated at waveform 209, when the Type C phase counter is at a count of 2. The count of 2 plus the factor 3 (2+3) or 5, is entered in the control word associated with line 4, so that each bit in this character is sampled when the current count of phase counter C during any subsequent scan is equal to 5.

It will be recalled that each of the 7 increments of a Type C bit cover a period of time which is equal to two line scan intervals. Because of the ON-OFF state of the phase active trigger in phase counter C, however, only one of the two line scan intervals is effective during a Type C bit increment, that is when the phase active trigger is ON. The influence of the phase active trigger can be seen in FIGURE 4 and FIGURE 5. In FIGURE 4, a phase count can be gated into a Type C control word only when the phase counter C active (PCC Active) line 416 is up, which will occur on alternate line scans. In the compare circuitry of FIGURE 5, the same gating signal on lines 522 and 523 limits a Type C compare operation for sampling purposes to alternate line scans.

The flexibility afforded by the invention can be observed by referring to line scan interval 210 in FIGURE 2. It can be seen that both the Type A line 2 will be sampled when its control word is in register 116 at an A type phase count of 3, and the Type C line 4 will also be sampled in the same line scan interval 210 when its control word is in register 116 at a C type phase count of 5.

Characters subsequently arriving on line 3, Type A, and line 5, Type B, at waveforms 211 and 212, respectively, are handled in a manner comparable to that for the other lines just described.

It is apparent that a novel system has been described which is highly adaptable and which accommodates in an efficient and accurate manner, the data handling requirements of a variety of equipments operating at different transmission rates and with random intermixing of rates.

While the invention has been particularly shown and described with reference to a preferred embodiment thereof, it will be understood by those skilled in the art that various changes in form and detail may be made without departing from the spirit and scope of the invention.

What is claimed is:

1. A multiple rate data system, comprising:
a plurality of data sources, each of said sources supplying data on an associated line at a preselected one of a plurality of transmission rates;
line scanning means for detecting and sampling data on said lines;
and means operable as each line is encountered during a line scan, for establishing in said scanning means a sample rate that is compatible with the preselected transmission rate of that line.

2. A multiple rate data system, comprising:
a plurality of data sources, each of said sources supplying data bits on an associated line at a preselected one of a plurality of transmission rates;
line scanning means for detecting and sampling data bits on said lines;
means operable as each line is encountered during a line scan, for establishing in said scanning means a sample rate that is compatible with the preselected transmission rate of that line;
and means for storing bits from each line when sampled.

3. A multiple rate data system for transferring information between a plurality of data sources, each operating at a preselected one of a plurality of transmission rates, and a data handling device operating at a particular rate, comprising:
a line associated with each said source over which it supplies data bits;
line scanning means for detecting and sampling data bits on said lines;
means operable as each line is encountered during a line scan, for establishing in said scanning means a sample rate that is compatible with the preselected transmission rate of that line;
means for storing bits from each line when sampled;
and means for transferring said data bits from said storage means at said particular rate.

4. A multiple rate data system, comprising:
a number of data sources, each of said sources supplying data bits on an associated line at one of a plurality of bit transmission rates, with each rate having a related bit interval type of particular duration;
a plurality of pulse generating means respectively associated with said bit interval types, each of said generating means repetitiously providing a sequence of pulses which corresponds in overall duration to its related bit interval type;
means for scanning said lines in order to detect and sample data bits;
and means for gating each said pulse generating means to establish its pulse sequence for sampling purposes when any line having a corresponding bit interval is encountered during a line scan.

5. A multiple rate data system, comprising:
a number of data sources, each of said sources supplying data bits on an associated line at one of a plurality of bit transmission rates, with each rate having a related bit interval type of particular duration;
a plurality of phase counters respectively associated with said bit interval types, each of said counters repetitiously providing a counting pulse sequence which corresponds in overall duration to its related bit interval type;
means for scanning said lines in order to detect and sample data bits;
and means for gating each said counter to establish its counting sequence for sampling purposes when any line having a corresponding bit interval is encountered during a line scan.

6. A data system for receiving data bits from a group of input lines where each line is operating at one of a plurality of bit rates with a related bit interval type, comprising:
a master oscillator;
individual phase counters driven in common by said oscillator through cycles respectively corresponding to each said bit interval type;
means for scanning each of said lines in turn;

and means for gating the output of a particular said counter for establishing line sample time during any scan interval when an input line having a related bit interval type is scanned.

7. A data system for receiving data bits from a group of input lines where each line is operating at one of a plurality of bit rates with a related bit interval type, said individual rates and related intervals being functionally related to one another, comprising:

a master oscillator;

individual phase counters driven in common by said oscillator through functionally related cycles respectively corresponding to each said bit rate and its related bit interval type;

means for scanning each of said lines in turn;

and means for gating the output of a particular said counter for establishing line sample time during any scan interval when an input line operating at the related bit rate is being scanned.

8. A multiple rate data system, comprising:

a plurality of data sources, each of said sources providing data characters having a number of data bits on an associated line at a predetermined one of a plurality of transmission rates;

individual means for generating phase count sequences that correspond respectively in duration to the bit interval established by each said rate;

means for storing a plurality of control words, each of said control words being associated with a particular one of said lines;

a control word register;

means for scanning each of said lines in sequence, and for concurrently entering its associated control word into said register;

means for detecting the start of a character on any newly activated line during a line scan interval;

means responsive to an output from said detection means for gating a phase count into the control word associated with said newly activated line from the phase count generating means that is related to the transmission rate of said line;

and means actuated under control of the phase count in said control word for sampling the bits in said character at a particular phase count of the related generating means during succeeding line scan intervals.

9. A multiple rate data system, comprising:

a plurality of data sources, each of said sources providing data characters having a number of data bits on an associated line at a predetermined one of a plurality of transmission rates;

individual means for generating phase count sequences that correspond respectively in duration to the bit interval established by each said rate;

means for storing a plurality of control wörds, each of said control words being associated with a particular one of said lines;

a control word register;

means for scanning each of said lines in sequence, and for concurrently entering its associated control word into said register;

means for detecting the start of characters on a plurality of newly activated lines during any line scan interval;

means responsive to outputs from said detection means during said line scan interval for gating phase counts into the control words associated with said newly activated lines from the phase count generating means that are related to the transmission raets of said individual lines;

and means actuated under control of the phase counts in said control words for sampling the character bits on the respectively associated lines at particular phase counts of the related generating means during succeeding line scan intervals.

10. A multiple rate data system, comprising:

a plurality of data sources, each of said sources providing data characters having a number of data bits on an associated line at a predetermined one of a plurality of transmission rates;

individual means for generating phase count sequences that correspond respectively in duration to the bit interval established by each said rate, each of said sequences defining a predetermined number of increments within a related bit interval;

means for storing a plurality of control words, each of said control words being associated with a particular one of said lines;

a control word register;

means for scanning each of said lines in sequence, and for concurrently entering its associated control word into said register;

means for detecting the start of a character on any newly activated line during a line scan interval;

means responsive to an output from said detection means for gating an encoded phase count into the control word associated with said newly activated line that is based on the current phase count of the generating means that is related to the transmission rate of said line;

and means actuated under control of the encoded phase count in said control word for sampling the bits in said character during a particular bit increment when said encoded phase count equals the current phase count of the related generating means during succeeding line scan intervals.

11. A multiple rate data system, comprising:

a plurality of data sources, each said source providing data characters having a number of data bits on an associated line at a predetermined one of a plurality of transmission rates;

individual means for generating phase count sequences that correspond respectively in duration to the bit interval established by each said rate;

a data memory;

means for storing a plurality of control words, each of said control words being associated with a particular one of said lines, and each said control word containing a phase count field, and an address field;

a control word register;

means for scanning each of said lines in sequence, and for concurrently entering its associated control word into said register;

means for detecting the start of a character on any newly activated line during a line scan interval;

means responsive to an output from said detection means for gating a phase count into the phase count field of the control word associated with said newly activated line from the phase count generating means that is related to the transmission rate of said line;

means actuated under control of the phase count in said control word for sampling the bits in said character at a particular phase count of the related generating means during succeeding line scan intervals;

and means for transferring said sampled data bits to said data memory at the address specified in the address field of said associated control word.

References Cited by the Examiner

UNITED STATES PATENTS

| | | | |
|---|---|---|---|
| 3,045,211 | 7/1962 | Auerbach | 340—172.5 |
| 3,099,818 | 7/1963 | Murray | 340—172.5 |

ROBERT C. BAILEY, *Primary Examiner.*

MALCOLM A. MORRISON, *Examiner.*